United States Patent [19]
Reilly et al.

[11] Patent Number: 5,779,260
[45] Date of Patent: Jul. 14, 1998

[54] METHOD AND APPARATUS FOR ADJUSTING STRUT-TYPE SUSPENSION SYSTEMS

[76] Inventors: Bruce John Reilly; Bruce Sean Reilly, both of 1-5 Campbell Street, Narellan, NSW 2567, Australia

[21] Appl. No.: 652,831

[22] Filed: May 23, 1996

[30] Foreign Application Priority Data

May 23, 1995 [AU] Australia ............... PN3137

[51] Int. Cl.$^6$ .................................. B62D 17/00
[52] U.S. Cl. .................. 280/661; 403/4; 411/539
[58] Field of Search ................ 280/661; 403/3, 403/4; 411/537, 539, 366, 383

[56] References Cited

U.S. PATENT DOCUMENTS

| Re. 34,659 | 7/1994 | Reilly | 280/661 |
|---|---|---|---|
| 2,890,893 | 6/1959 | Laukhuff | 280/661 |
| 3,866,938 | 2/1975 | Boyd et al. | 280/661 |
| 4,313,617 | 2/1982 | Muramatsu et al. | 280/661 |
| 4,616,845 | 10/1986 | Pettibone | 280/661 |
| 4,695,073 | 9/1987 | Pettibone et al. | 280/690 |
| 4,706,987 | 11/1987 | Pettibone et al. | 280/661 |
| 4,982,977 | 1/1991 | Shimada | 280/661 |
| 5,104,141 | 4/1992 | Grove et al. | 280/661 |

FOREIGN PATENT DOCUMENTS

| 31 31 107 | 12/1982 | Germany | 280/661 |
|---|---|---|---|
| 32 00 836 | 7/1983 | Germany | 280/661 |

*Primary Examiner*—Peter C. English
*Attorney, Agent, or Firm*—Knobbe, Martens, Olson & Bear, LLP

[57] ABSTRACT

A camber adjusting device for use in a strut-type suspension system comprises a bolt fitted with a centrally disposed eccentric sleeve. At each end of the sleeve when on the bolt there is fitted an eccentric portion. Each eccentric portion is sized to project into aligned bores in respective flanges while the sleeve is adapted to fit within a bore of a further part of the strut-type suspension system to facilitate eccentric displacement between the bore in the further part and the bores in the flanges.

19 Claims, 5 Drawing Sheets

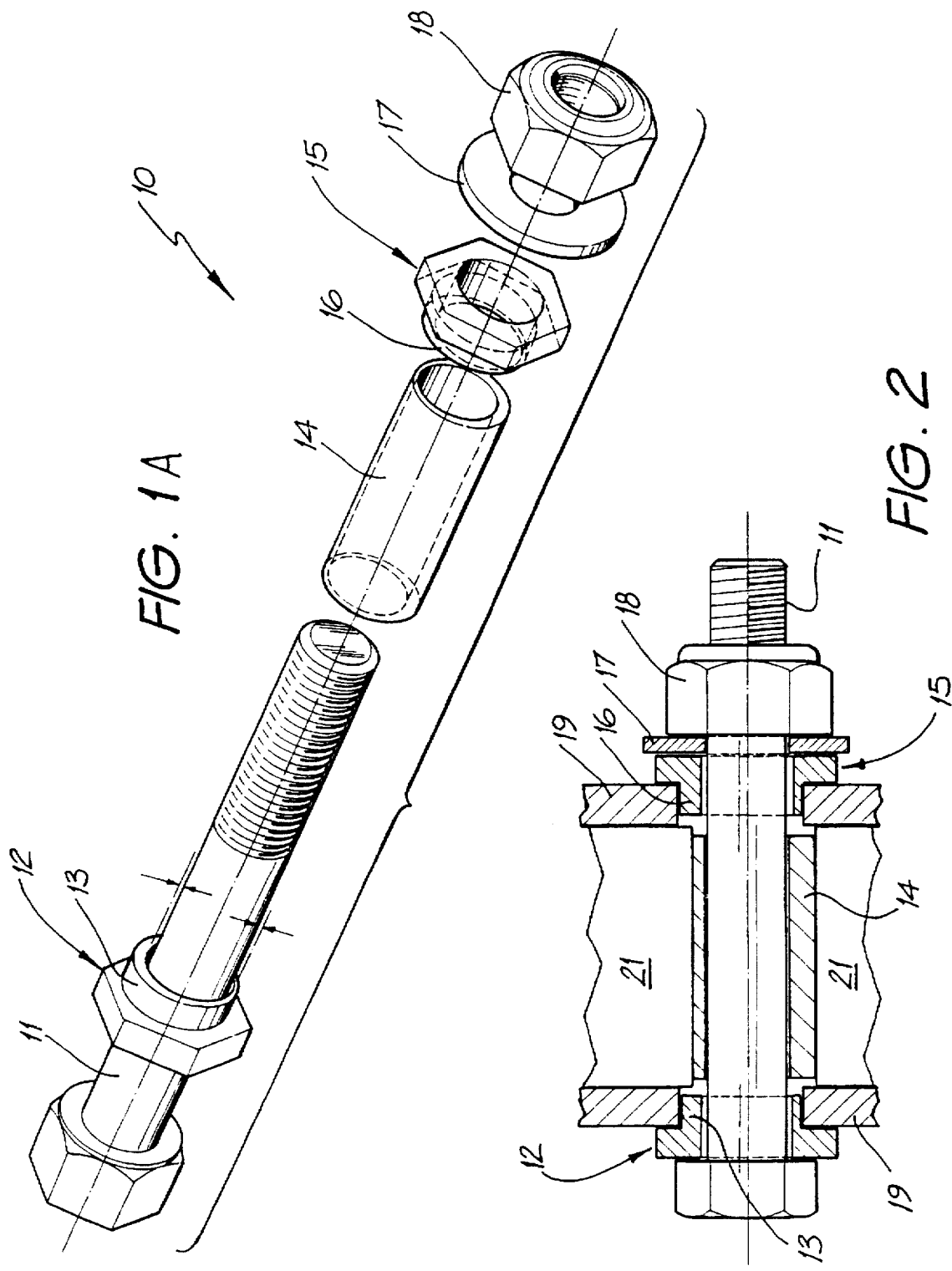

METHOD AND APPARATUS FOR ADJUSTING STRUT-TYPE SUSPENSION SYSTEMS

TECHNICAL FIELD

The present invention relates to apparatus for adjusting the camber in vehicles having essentially non-adjustable suspension systems.

BACKGROUND ART

The present invention is particularly suited to use on vehicle suspension systems which comprise a generally vertically arranged support strut having a knuckle assembly secured to its lower end. Such suspension systems are referred to in the art as Macpherson strut suspension systems. The present invention is well adapted for use when servicing vehicles having such non-adjustable suspension systems so as to restore the proper camber to a wheel or for modifying that camber as desired.

There are a range of proposals for camber adjustment with which the present invention is concerned and they are exemplified by the disclosures of U.S. Pat. Nos. 5,104,141; 4,706,987; 4,695,073; 4,982,977; 4,313,617; 3,866,938 and 4,615,845.

The function achieved by the present invention is typified by the cam arrangement of U.S. Pat. Nos. 5,104,141 sold under the brand name "MAGNA CAM". In that product, which uses a smaller diameter bolt than the original which clamps the suspension strut to the knuckle assembly, the bolt is further weakened by offset machining to produce its eccentric shank which is fitted with an auxiliary slotted eccentric sleeve. The formation of an eccentric shank in a bolt as used in the MAGNA CAM arrangement results in stress concentrations and reduced shear strength at the discontinuities along the bolt when in use which is poor engineering practice.

DISCLOSURE OF INVENTION

In contrast the present invention provides an undersized, preferably high tensile, bolt for fitment through an attachment member which is fixedly secured to the lower end of a suspension support strut having a knuckle assembly secured thereto.

The knuckle assembly of a first arrangement is secured to the attachment member typically by two through-bolts passing through laterally outwardly extending legs of a "U"-shaped attachment member which act as mounting flanges which locate therebetween the knuckle assembly in fixed relation to the strut by means of those bolts. The bolts passing through respective vertically spaced apart bores in the mounting flanges which are aligned with corresponding bores in the knuckle assembly.

In an alternative arrangement, the attachment member is in the form of a laterally outwardly extending rib extending longitudinally of the strut adjacent the lower end of the strut while the knuckle assembly comprises laterally extending flanges which fit either side of the rib on the strut. Two vertically spaced apart through bolts passing through the flanges and rib of the alternative arrangement are used to clamp the flanges to the rib to fix the position of the knuckle assembly relative to the strut.

A bolt and eccentric sleeve combination of the present invention is adapted to be received within one or the other of the spaced apart bores.

In one aspect the present invention provides a camber adjusting device for a strut-type suspension system; said device comprising a bolt having a centrally disposed eccentric sleeve rotatably mountable on the shank of the bolt; the head end of the bolt having an eccentric portion projecting axially from the head toward the centrally disposed sleeve and the threaded end of the bolt, a corresponding further eccentric portion adapted to be slidably mounted over the threaded end of the bolt so as to project toward the eccentric projecting portion at the head end of the bolt, further wherein the amount of eccentricity of each eccentric portion relative to the axis of the bolt is the same and the outside diameters of the eccentric portions and of the eccentric sleeve are the same and which outside diameter corresponds to the diameter of a bore in a steering knuckle assembly of a vehicle suspension system wherein the knuckle assembly is adapted to be mounted to a suspension support strut via a bolt through said bore.

In a first embodiment the eccentric portion at the head end of the bolt is formed integrally with the head of the bolt.

In a second embodiment the eccentricity of the eccentric portions and of the sleeve are the same.

In a preferred form the eccentric portion at the head end of the bolt is a sleeve which is slidably removable from the bolt. The eccentric portion at the threaded and of the bolt being formed with a radially projecting flange at its end distal to the shank of the bolt when in situ. Preferably, the flange is formed with at least a pair of diametrically disposed flat faces on the flange to facilitate varying the position of the eccentricity of the portion relative to that of the sleeve.

The eccentric projections extending inwardly axially of the bolt at opposite ends of the bolt extend up to the dimension of the thickness of mounting flanges of the attachment member at the lower end of the strut or the thickness of laterally extending flanges of the knuckle assembly, whichever arrangement is applicable, while the eccentric sleeve on the shank of the bolt is of a longitudinal extent up to the length of the bore in the knuckle assembly or rib on the strut, respectively, to which it is to be fitted in use.

It is preferred that the eccentric sleeve on the shank of the bolt has an outer diameter which provides a firm push-fit into the complementary bore in the knuckle assembly or strut rib, as applicable.

In a further aspect the present invention provides a strut-type suspension system of a vehicle comprising a bracket secured to a lower end portion of the strut and connecting an upper end portion of a steering knuckle to the lower end portion of the strut, the bracket comprising a pair of parallel flanges projecting outwards from the strut, each flange comprising a pair of vertically spaced apart bores aligned with bores through the upper end portion of the steering knuckle, and wherein at least one of those pairs of bores and the aligned bore of the steering knuckle is fitted with a camber adjusting device for a strut-type suspension system; said device comprising a bolt having a centrally disposed eccentric sleeve rotatably mountable on the shank of the bolt; the head end of the bolt having an eccentric portion projecting axially from the head toward the centrally disposed sleeve and the threaded end of the bolt, a corresponding further eccentric portion adapted to be slidably mounted over the threaded end of the bolt so as to project toward the eccentric projecting portion at the head end of the bolt, further wherein the amount of eccentricity of each eccentric portion relative to the axis of the bolt is the same and the outside diameters of the eccentric portions and of the eccentric sleeve are the same and which outside diameter corresponds to the diameter of a bore in a steering knuckle assembly of a vehicle suspension system wherein the knuckle assembly is adapted to be mounted to a suspension support strut via a bolt through said bore.

A still further aspect of the invention consists in a method of adjusting the camber of a steering knuckle assembly in a strut-type suspension system having a bracket secured to a lower end portion of the strut and connecting an upper end portion of a steering knuckle to the lower end portion of the strut, the bracket comprising a pair of parallel flanges projecting outwards from the strut, each flange comprising a pair of vertically spaced apart bores aligned with bores through the upper end portion of the steering knuckle, said method comprising removing any original fitted bolt and any associated concentric sleeve from any of the pairs of bolt holes and associated bore in the upper end portion of the steering knuckle;

fitting an eccentric sleeve into the bore of the steering knuckle;

fitting a headed bolt through the bore in one said flange such that an eccentric portion at the headed end of the bolt fits into the bore in the adjacent flange and the shank of the bolt passes through the bore of the sleeve;

fitting a further eccentric portion to the threaded end of the bolt such that the eccentric part fits into the bore in the flange adjacent the threaded end of the bolt; and tightening a nut onto the threaded end of the bolt once the camber of the steering knuckle has been adjusted.

In use with the above discussed first arrangement, the original bolt of the upper or lower connection between the knuckle and the strut is removed whereafter the eccentric sleeve from the shank of the bolt is inserted into that knuckle bore. When that sleeve is fitted to the lower bore, the thicker portion of the eccentric faces inwardly of the vehicle to increase camber and outwardly of the vehicle to decrease camber. When inserted in the upper bore the camber adjustment effect is reversed. After fitment of the eccentric sleeve into the knuckle bore in the desired orientation the bolt with its eccentric portion at the head end is pushed through the series of bores with that head end eccentric portion fitting into the bore of one leg of the U-shaped mounting flange. Thereafter the threaded end eccentric portion is fitted into the other leg of the U-shaped mounting flange, a washer or washers are fitted over the threaded end and the assembly is clamped via a lock nut threaded onto the bolt after final adjustment of the degree of camber. That adjustment is achieved by rotation of the eccentric portions at the head and thread ends of the bolt relative to the sleeve on the shank of the bolt. Adjustment of the bolt end cams or eccentric portions is desirably achieved by having hexagon heads on those eccentric portions which heads abut the outer surfaces of the mounting flanges of the U-shaped attachment member so that they can be rotated by a spanner to facilitate final camber adjustment.

BRIEF DESCRIPTION OF DRAWINGS

The present invention will now be described by way of example with reference to the accompanying drawings, in which:

FIG. 1A is an exploded view of one embodiment of a cam adjuster unit in accord with the present invention;

FIG. 2 is a cross-sectional view through an adjuster unit of FIG. 1A when in situ in one orientation;

BEST MODES

Figure 1B:
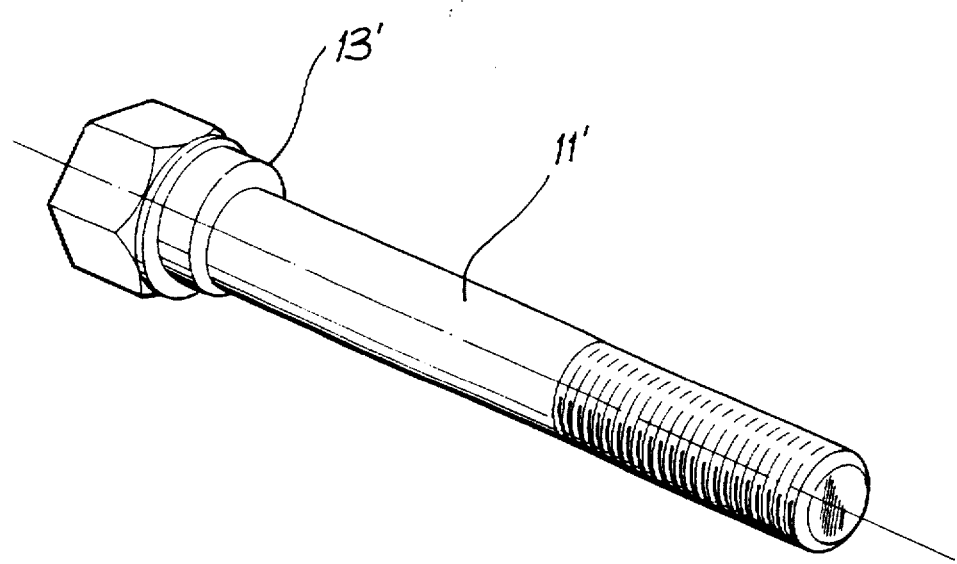
FIG. 1B is a perspective view of an eccentric portioned bolt of another embodiment.

The cammed bolt adjuster 10 of FIG. 1A comprises a high tensile hexagon head bolt 11 having an outside diameter of, say, 10 mm which is to fit in a 12 mm bore in use. A hexagon headed eccentric sleeve unit 12 is slidably fitted onto bolt 11 to be displaced to the head end of the bolt. The eccentric sleeve portion 13 has an outside diameter of 12 mm. An intermediate eccentric sleeve 14 of the same eccentricity and outside diameter as sleeve portion 13 is freely slideable over the shank of bolt 11 while at the threaded end there is located an additional hexagon headed sleeve unit 15 with its eccentric sleeve portion 16 which is identical to hexagon headed sleeve unit 12. Washer 17 and nut 18 complete the cammed bolt adjuster 10.

In another embodiment (not depicted) the hexagonal head of each sleeve 12, 15 is eccentrically displaced relative to the axis of the outside diameter of their respective sleeve portions 13, 16. By this arrangement the circumferential position of, say, the thickest section of sleeve portions 13, 16 can be shown by the position of reference or index markers (not shown) on flats of the hexagonal heads of units 12, 15 when the unit is in situ. By noting the misalignment between those aligned markers and the maximum offset of the sleeve 14, the degree of camber change can be finely adjusted by common rotation of those index markers relative to the sleeve 14.

In FIG. 2 there is shown the adjuster 10 of FIG. 1 in situ where flanges 19 of a knuckle assembly 20 (FIG. 3) are clamped to either side of a rib 21 projecting from strut 22. The bore in flanges 19 corresponds to the bore in rib 21 which is sized at 12 mm.

As shown in the section view of FIG. 2 there is a maximum offset between the bore in flanges 19 and the bore in rib 21 as a result of the depicted orientation of the adjuster 10.

Figure 3:
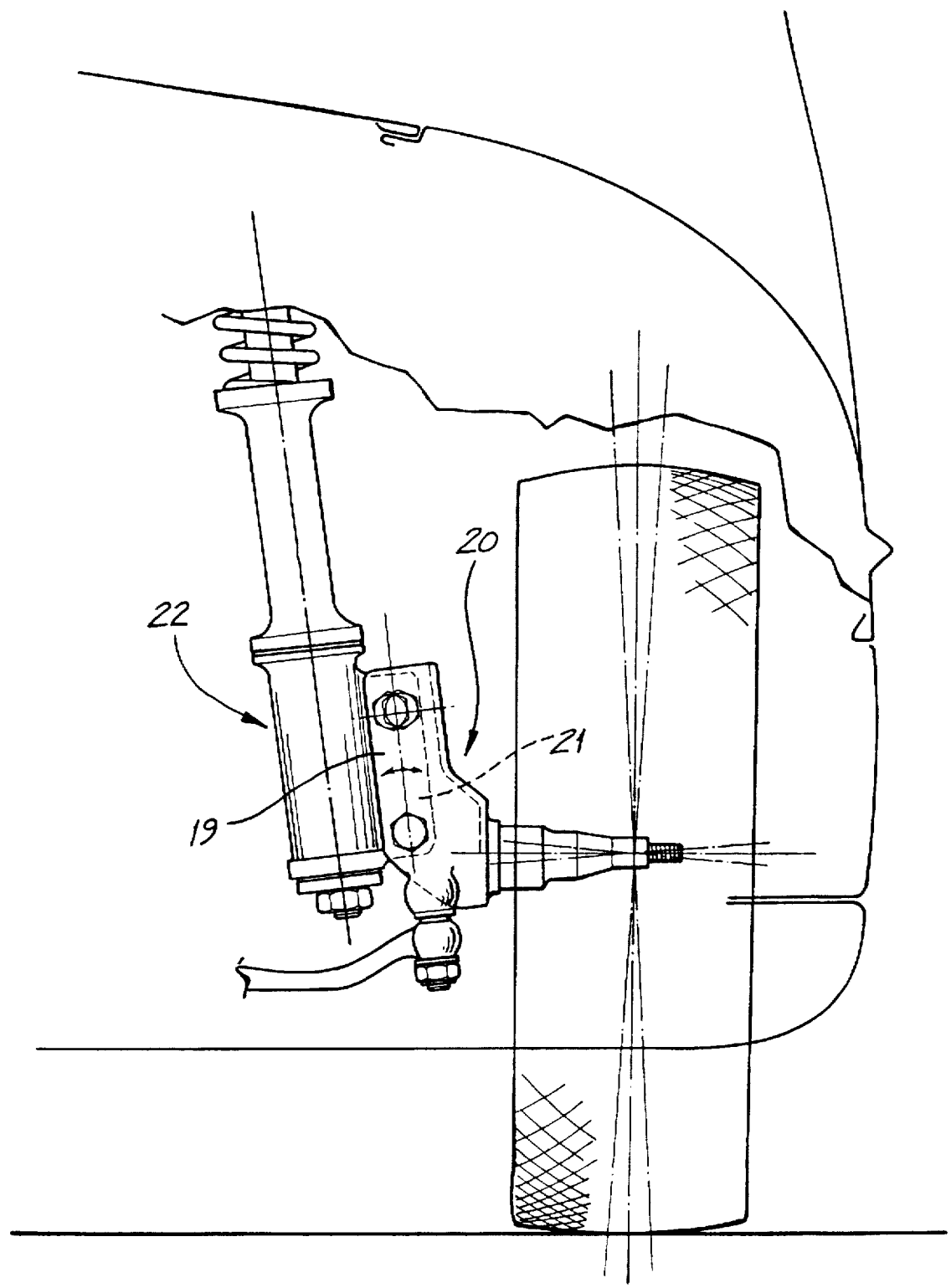
FIG. 3 is a front elevational view of a strut and knuckle assembly exhibiting the range of adjustments of an adjuster in accord with FIG. 1 when in situ.

FIG. 3 depicts a first arrangement, as previously described, of a knuckle assembly and strut connection where the adjuster 10 is shown in the uppermost bolt hole connection between the knuckle assembly 20 and the strut 22 while it could be equally well placed in the bottom bolt hole connection between those components.

The preferred mode of fitment of an adjuster 10 of the FIG. 1 embodiment to the top bolt hole connection between the strut 22 and the knuckle assembly is as follows:

Remove the original fitted (12 mm diameter) bolt from the upper bolt hole in the strut and knuckle assembly.

Push fit the eccentric sleeve 14 into the bolt hole in rib 21 of strut 22 so that the camber is either reduced with the thicker wall of the sleeve facing inwardly of the vehicle or outwardly in the case where the camber is to be increased.

Hexagonal headed eccentric sleeves 12 and 15 are then placed in the bores in the flanges 19.

Bolt 11 is inserted through the assembly in the manner shown in FIG. 2.

The hexagon headed sleeves 12 and 15 are then rotated with respect to a reference marker to provide a fine adjustment to the camber which is required.

The nut 18 is then tightened to the required torque to lock the camber adjustment in place.

The adjuster 10 may be fitted to the lower hole in the strut 22 and knuckle assembly 20 in which case the positioning of the thickest wall of the sleeve to achieve increased or reduced camber is reversed compared with when the adjuster is used in the top bolt hole.

Figure 4:
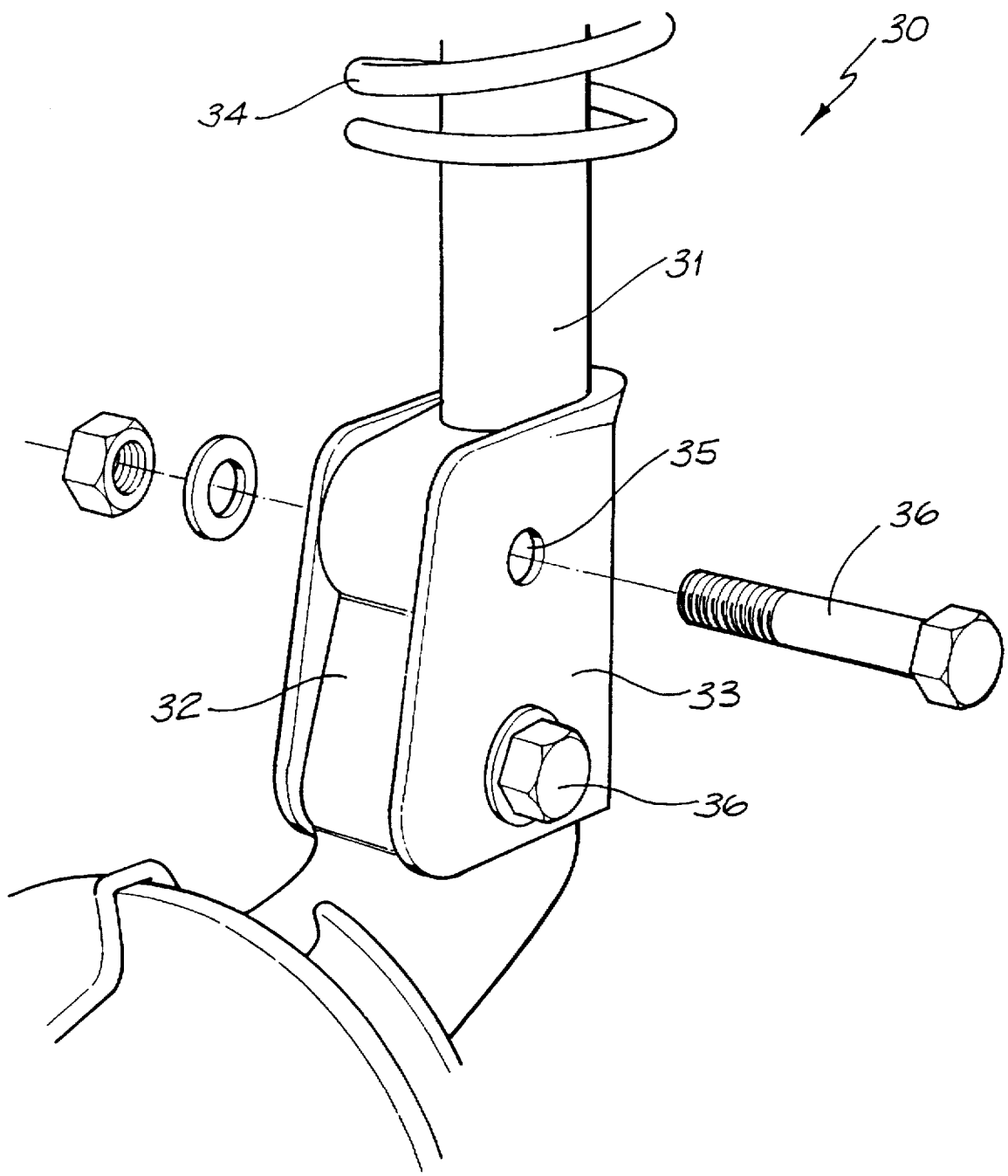
FIG. 4 is a perspective view of a relevant portion of a prior art strut suspension system different from that of FIG. 2 but also suited to a camber adjusting device of FIGS. 1 and 2.

The strut type suspension system 30 of FIG. 4 comprises strut 31 formed as a damper or shock absorber shaft connected at its lower end to steering knuckle 32 by a support bracket 33. A suspension spring 34 is shown mounted around the strut 31.

Steering knuckle 32 is mounted to strut 31 via bolts 36 passing between the flanges of bracket 33 and through respective bores 35 of steering knuckle 32.

The arrangement of FIGS. 1 and 2 can be readily mounted in place of one of bolts 36 of the mounting means between steering knuckle 32 and strut 31 of FIG. 4. The camber adjustment possible by means of cam adjuster unit of FIGS. 1 and 2 will be readily appreciated by the addressee without further detailed explanation.

Figure 5:
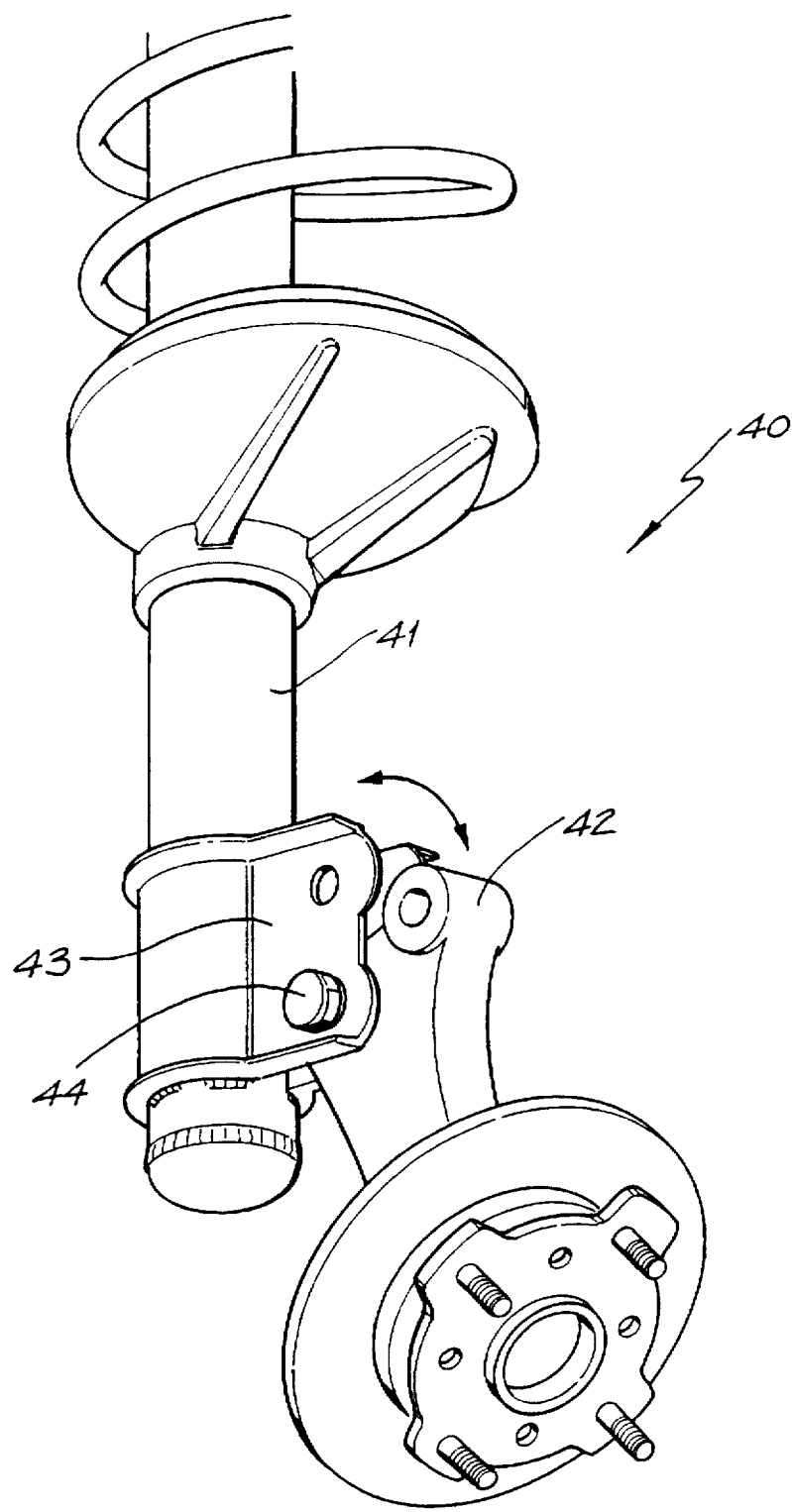
FIG. 5 is a perspective of a relevant portion of yet another prior art strut suspension system suited to a camber adjusting device of FIGS. 1 and 2.

In the strut type suspension system 40 of FIG. 5 strut 41 is mounted to steering knuckle 42 via support bracket 43 and through bolts 44, only one of which is shown in FIG. 4.

With the top through bolt removed from bracket 43 and steering knuckle 42 as shown in FIG. 4, that steering knuckle is free to pivot about the bottom bolt 44 to facilitate fitment of an adjuster fit of FIGS. 1 and 2 in a manner readily understood by the addressee.

The general nature of the form of adjustment to be achieved by adjusters in accord with the present invention are well understood in the art as exemplified by the discussions contained in U.S. Pat. Nos. 4,706,987 and 5,104,141.

In the embodiment depicted in FIGS. 1 and 2 the hexagon headed eccentric sleeves 12 and 15 are preferably of steel or other suitable metal while intermediate eccentric sleeve 14 may be of metal or plastics material.

In another embodiment (FIG. 1B) the eccentric sleeve portion 13' at the head end of bolt 11' is formed integrally with that bolt in which case there is one less separate component as compared with the adjuster 10 as shown in the drawings.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A camber adjusting device for a strut suspension system; said device comprising a bolt having a head, shank and threaded end remote from the head, a centrally disposed eccentric sleeve rotatably mountable on the shank of the bolt; the head end of the bolt having an eccentric portion projecting axially from the head toward the centrally disposed sleeve and the threaded end of the bolt, a corresponding further eccentric portion adapted to be slidably mounted over the threaded end of the bolt so as to project toward the eccentric projecting portion at the head end of the bolt, further wherein the amount of eccentricity of each eccentric portion relative to the axis of the bolt is the same and the outside diameters of the eccentric portions and of the eccentric sleeve are the same and which outside diameter corresponds to the diameter of a bore in a steering knuckle assembly of a vehicle suspension system adapted to receive the device, wherein in use the knuckle assembly is adapted to be mounted to a suspension support strut via the bolt through said bore and aligned bores in a pair of support brackets of said strut when said support brackets sandwich the bore of the knuckle assembly therebetween, and wherein the length of the eccentric sleeve is no greater than the length of the bore in the steering knuckle assembly and the axial projection of each eccentric portion is no greater than the length of each respective bore in the pair of support brackets.

2. A device as claimed in claim 1 wherein the eccentric portion at the head end of the bolt is integrally formed with the head.

3. A device as claimed in claim 1, wherein the eccentric portion at the head end of the bolt is formed as a sleeve which is slidably removable from the bolt.

4. A device as claimed in claim 1 wherein the eccentricity of the eccentric portions and of the sleeve are the same.

5. A device as claimed in claim 1 wherein the eccentric portion at the threaded end of the bolt is formed with at least a pair of oppositely disposed flat faces on a radially projecting flange, which faces facilitate positioning of the eccentricity of that portion relative to the eccentricity of the sleeve when the device is in situ.

6. A device as claimed in claim 1, wherein the outer diameter of the eccentric sleeve is such that the sleeve is a firm push-fit with the complementary bore in the steering knuckle assembly.

7. A strut suspension system of a vehicle comprising a bracket secured to a lower end portion of a suspension strut, said bracket connecting an upper end portion of a steering knuckle to the lower end portion of the strut, the bracket comprising a pair of parallel flanges projecting outwards from the strut, each flange comprising a pair of vertically spaced apart bores aligned with bores through the upper end portion of the steering knuckle, and wherein at least one of those pairs of bores and the aligned bore of the steering knuckle is fitted with a camber adjusting device for the suspension system; said device comprising a bolt having a head, shank and threaded end remote from the head, a centrally disposed eccentric sleeve rotatably mounted on the shank of the bolt; the head end of the bolt having an eccentric portion projecting axially from the head toward the centrally disposed sleeve and the threaded end of the bolt, a corresponding further eccentric portion being slidably mounted over the threaded end of the bolt so as to project toward the eccentric projecting portion at the head end of the bolt, further wherein the amount of eccentricity of each eccentric portion relative to the axis of the bolt is the same and the outside diameters of the eccentric portions and of the eccentric sleeve are the same and which outside diameter corresponds to the diameter of the bores in the flanges and the upper end portion of the steering knuckle whereby the steering knuckle is mounted to the strut via the bolt through said aligned bores, and wherein the length of the eccentric sleeve is no greater than the length of the bores in the steering knuckle and the axial projection of each eccentric portion is no greater than the length of each respective bore in the pair of parallel flanges.

8. A strut suspension system as claimed in claim 7, wherein the eccentric portion at the head end of the bolt is integrally formed with the head.

9. A strut suspension system as claimed in claim 7, wherein the eccentric portion of the head end of the bolt is formed as a sleeve which is slidably removable from the bolt.

10. A strut suspension system as claimed in claim 7, wherein the eccentricity of the eccentric portions and of the sleeve are the same.

11. A strut suspension system as claimed in claim 7, wherein the eccentric portion at the threaded end of the bolt is formed with at least a pair of oppositely disposed flat faces on a radially projecting flange, which faces facilitate positioning of the eccentricity of that portion relative to the eccentricity of the sleeve when the bolt has been loosened.

12. A method of adjusting the camber of a steering knuckle in a strut suspension system having a bracket at a lower end portion of a strut, said bracket connecting an upper end portion of the steering knuckle to the lower end portion of the strut, the bracket comprising a pair of parallel flanges projecting outwardly from the strut, one flange comprising a pair of vertically spaced apart bores aligned with vertically spaced apart corresponding bores in the other flange and with each pair of aligned flange bores being aligned with a respective bore through the upper end portion of the steering knuckle and fitted with a bolt through each trio of aligned bores, said method comprising:

removing at least one of said bolts and any associated concentric sleeve from the flanges and steering knuckle;

fitting an eccentric sleeve with its eccentricity in a desired orientation into one of the bores of the steering knuckle to achieve at least an approximate camber adjustment of the knuckle relative to the strut, the length of the sleeve being no greater than the length of said one bore;

fitting a bolt having a head, a shank and a threaded end through one of said vertically spaced apart bores in one said flange aligned with the one bore of the steering knuckle such that an eccentric portion at the head end of the bolt fits into but not through the one bore in the one said flange and the shank of the bolt passes through an aligned bore of the sleeve and the aligned bore of the other flange;

fitting a further eccentric portion to the threaded end of the bolt such that the further eccentric portion fits into but not through the aligned bore in the other flange; and tightening a nut onto the threaded end of the bolt.

13. A method as claimed in claim 12, comprising rotatably adjusting the orientation of the eccentricities of the eccentric portions relative to the eccentricity of the sleeve before tightening the nut on the bolt.

14. A camber adjusting device for a strut suspension system; said device comprising a bolt having a head, shank and threaded end remote from the head, a centrally disposed eccentric sleeve rotatably mountable on the shank of the bolt; the head end of the bolt having an eccentric portion projecting axially from the head toward the centrally disposed sleeve and the threaded end of the bolt, a corresponding further eccentric portion adapted to be slidably mounted over the threaded end of the bolt so as to project toward the eccentric projecting portion at the head end of the bolt, further wherein the amount of eccentricity of each eccentric portion relative to the axis of the bolt is the same and the outside diameters of the eccentric portions and of the eccentric sleeve are the same and which outside diameter corresponds to the diameter of a bore in each of a pair of flanges of a steering knuckle assembly of a vehicle suspension system adapted to receive the device, wherein in use the knuckle assembly is adapted to be mounted to a suspension support strut via the bolt through each of said bores and an aligned bore in a rib of said strut when said flanges sandwich the bore of the rib therebetween, and wherein the length of the eccentric sleeve is no greater than the length of the bore in the rib and the axial projection of each eccentric portion is no greater than the length of each respective bore in the pair of flanges.

15. A device as claimed in claim 14, wherein the eccentric portion at the head end of the bolt is integrally formed with the head.

16. A device as claimed in claim 14, wherein the eccentricity of the eccentric portions and of the sleeve are the same.

17. A device as claimed in claim 14, wherein the eccentric portion at the threaded end of the bolt is formed with at least a pair of oppositely disposed flat faces on a radially projecting flange, which faces facilitate positioning of the eccentricity of that portion relative to the eccentricity of the sleeve when the device is in situ.

18. A device as claimed in claim 14 wherein the outer diameter of the eccentric sleeve is such that the sleeve is a firm push-fit with the complementary bore in the strut rib.

19. A device as claimed in claim 14 wherein at least one of the eccentric portion at the head end of the bolt or the corresponding further eccentric portion at the threaded end of the bolt, is configured to be rotated relative to the bolt to adjust the camber.

* * * * *